(12) United States Patent
Link et al.

(10) Patent No.: US 10,214,952 B2
(45) Date of Patent: Feb. 26, 2019

(54) TUBULAR DRIVE APPARATUS

(71) Applicant: Stabilus GmbH, Koblenz (DE)

(72) Inventors: Markus Link, Koblenz (DE); Dave Sabet, Bonn (DE); Michael Knopp, Sterling Heights, MI (US)

(73) Assignee: Stabilus GMBH, Koblenz (DE)

( * ) Notice: Subject to any disclaimer, the term of this patent is extended or adjusted under 35 U.S.C. 154(b) by 0 days.

(21) Appl. No.: 15/423,966

(22) Filed: Feb. 3, 2017

(65) Prior Publication Data

US 2017/0226789 A1    Aug. 10, 2017

(30) Foreign Application Priority Data

Feb. 5, 2016 (DE) .......................... 10 2016 201 772

(51) Int. Cl.
*E05F 15/622* (2015.01)
*F16H 25/20* (2006.01)

(52) U.S. Cl.
CPC .......... *E05F 15/622* (2015.01); *F16H 25/20* (2013.01); *E05Y 2201/434* (2013.01); *E05Y 2201/70* (2013.01); *E05Y 2201/702* (2013.01); *E05Y 2400/00* (2013.01); *E05Y 2400/44* (2013.01); *E05Y 2400/65* (2013.01); *E05Y 2900/532* (2013.01); *E05Y 2900/546* (2013.01); *F16H 2025/2031* (2013.01); *F16H 2025/2075* (2013.01)

(58) Field of Classification Search
CPC .................................................. E05F 15/622
See application file for complete search history.

(56) References Cited

U.S. PATENT DOCUMENTS

| 4,177,499 A | * | 12/1979 | Volkmann | H05K 7/209 361/690 |
| 5,701,631 A | * | 12/1997 | Lindquist | A47L 9/00 15/327.1 |
| 8,237,317 B2 | | 8/2012 | Bochen et al. | |

(Continued)

FOREIGN PATENT DOCUMENTS

CN      102404900 A  *  4/2012
CN      202836625 U  *  3/2013
(Continued)

OTHER PUBLICATIONS

German Search Report dated Sep. 12, 2016.
European Search Report filed in EP 17 15 4183 dated Jun. 12, 2017.

*Primary Examiner* — Hilary L Gutman
(74) *Attorney, Agent, or Firm* — Rankin, Hill & Clark LLP

(57) ABSTRACT

Tubular drive apparatus for a panel of a vehicle, preferably a tailgate or door, comprising two tubes which are inserted into one another in a telescopic manner, the free ends of which are each hinged to the panel of the vehicle and to the vehicle itself, the tubes being capable of being separated from one another and brought together by means of a spindle which is driven by an electric motor and comprises a spindle nut arranged thereon, in order to thus open and close the panel, the electric motor, the spindle, the spindle nut and an electronic circuit board comprising sensor elements being arranged within the tubular drive apparatus, and a power electronics unit for actuating the electric motor also being arranged on the electronic circuit board.

6 Claims, 1 Drawing Sheet

(56) References Cited

U.S. PATENT DOCUMENTS

Figure 1:
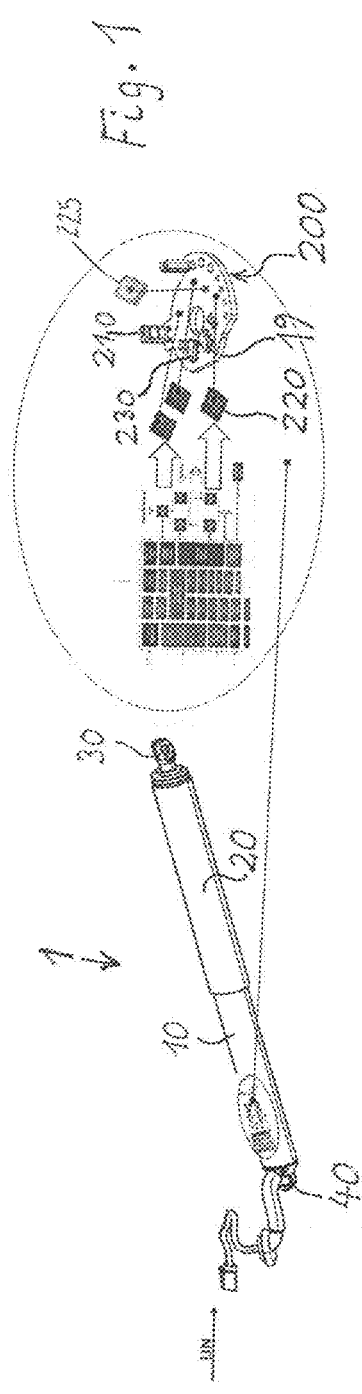

| | | | | |
|---|---|---|---|---|
| 9,605,464 | B2* | 3/2017 | Kessler | E05F 15/60 |
| 9,933,295 | B2* | 4/2018 | Fish | G01H 1/003 |
| 2005/0134470 | A1* | 6/2005 | Bos | A63B 71/06 |
| | | | | 340/665 |
| 2008/0046153 | A1* | 2/2008 | Oualkadi | E05F 15/41 |
| | | | | 701/49 |
| 2012/0137591 | A1* | 6/2012 | Bochen | E05F 15/622 |
| | | | | 49/324 |
| 2015/0040698 | A1* | 2/2015 | Kessler | H02K 1/17 |
| | | | | 74/89 |
| 2015/0168268 | A1* | 6/2015 | Fish | G05B 23/0235 |
| | | | | 374/142 |
| 2015/0253365 | A1* | 9/2015 | Auguste | G01R 21/00 |
| | | | | 324/251 |
| 2016/0177609 | A1* | 6/2016 | Nishikibe | E05F 1/002 |
| | | | | 49/31 |
| 2017/0145727 | A1* | 5/2017 | Yamagata | F16H 25/2454 |
| 2018/0145623 | A1* | 5/2018 | Xiang | H02P 29/60 |

FOREIGN PATENT DOCUMENTS

| | | | |
|---|---|---|---|
| CN | 204026375 U | * | 12/2014 |
| CN | 204595464 U | * | 8/2015 |
| CN | 204629280 U | * | 9/2015 |
| DE | 102006030986 | | 1/2008 |
| DE | 102008030247 | | 1/2010 |
| DE | 202011109760 | | 3/2012 |
| EP | 0854262 | | 7/1998 |
| JP | 2001224155 A | * | 8/2001 |

* cited by examiner

TUBULAR DRIVE APPARATUS

The present invention relates to a tubular drive apparatus for a panel of a vehicle, preferably a tailgate or door, comprising two tubes which are inserted into one another in a telescopic manner, the free ends of which are each hinged to the panel of the vehicle and to the vehicle itself, the tubes being capable of being separated from one another and brought together by means of a spindle which is driven by an electric motor and comprises a spindle nut arranged thereon, in order to thus open and close the panel. In this case, the electric motor, the spindle, the spindle nut and an electronic circuit board comprising sensor elements are arranged within the tubular drive apparatus.

Tubular drive apparatuses of this type are attached, for example, to a tailgate of a motor vehicle in lieu of the conventional gas springs in order to open and close the tailgate automatically or by remote control. What is of vital importance in this connection is that the size of these drive apparatuses must not be substantially greater than the size of the gas springs which are conventionally used. Nevertheless, the drive apparatus has to cover a relatively long working region, without said apparatus being longer than the conventional gas springs.

Such drive apparatuses have hitherto usually been actuated by a separate power electronics unit in its own housing, which controlled the speed of the electric motor of the drive apparatus by means of pulse width modulation. There was only a small sensor circuit board in the drive apparatus itself, which detected the movement direction and speed of movement of the panel mostly by means of Hall sensors. The power electronics unit for controlling the drive motor had to be accommodated somewhere in the vehicle. This meant that space was used up elsewhere in the vehicle, an additional component had to be installed and the PWM-pulsed operating current had to be transferred via longer cables. The latter in particular regularly led to significant problems with respect to electromagnetic compatibility. The connecting cables between the power electronics unit and the drive apparatus led to significant interference emissions owing to the 20 kHz pulse width modulation frequency. In addition, the considerable cable lengths and the plug connectors which were additionally required led to a significant drop in voltage across the total resistance of the cable and the various plug connectors required according to the prior art. Today, the total resistance in drive apparatuses according to the prior art is approximately 250 mΩ. This results in a voltage loss when the motor current is 10 A of 2.5 V, which can already lead to significant problems in a 12 V network.

This problem has already been acknowledged in the closest prior art DE 10 2008 030 247 A1 from the same applicant. In this case, an attempt was made to install the power electronics unit, which is otherwise provided in a separate housing as a distinct device, and an electrical energy store directly into the drive apparatus. However, this resulted in the overall length of the drive apparatus being unacceptably enlarged, and therefore this solution could not be implemented since the drive apparatus according to this prior art could no longer fit in the installation space originally provided for the gas spring.

Proceeding from this prior art, the object of the present invention therefore consists in providing a tubular drive apparatus which can be installed without difficulty, for example, in the tailgate of a motor vehicle in lieu of gas springs and which, nevertheless, does not cause any interference emissions (EMC) and also keeps the drop in voltage via the connecting cables low, in particular when beginning to open the panel.

According to the invention, for the first time, the power electronics unit for actuating the electric motor can be miniaturised to such an extent that there is also space therefor on the sensor circuit board which is also present in the drive apparatuses from the prior art, and therefore no further installation space has to be provided for the power electronics unit, which would result in an unacceptable increase in the size of the drive apparatus.

In this case, it is particularly preferable to arrange the electronic circuit board directly on the electric motor between the electric motor and the free end of the tube supporting the electric motor. In this manner, the cable paths supplied with PWM frequency are particularly short and, likewise, the drop in voltage between the electronics unit and the motor is minimised.

It is particularly preferable for the electronic circuit board to be in the shape of a disc and to be arranged perpendicularly to the axis of symmetry of the tubes. In this manner, the entire electronics unit only requires the smallest possible installation space.

Figure 2:
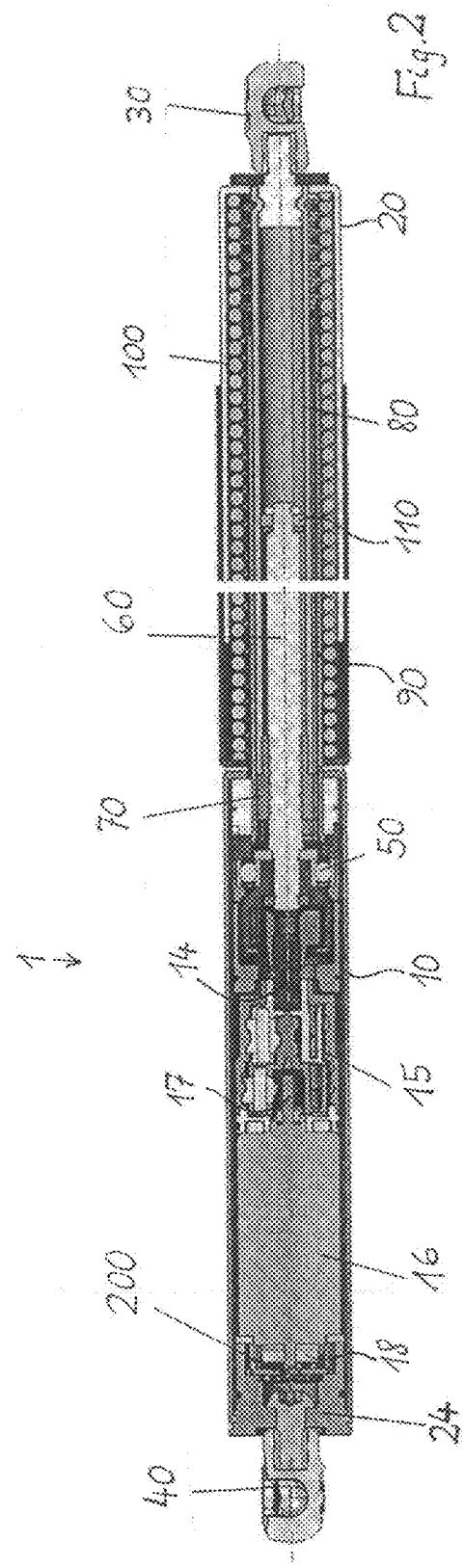

Furthermore, it is particularly preferable for the electronic circuit board to comprise a temperature sensor. Since the circuit board can be arranged so close to the motor, any overheating of the motor can be detected by simply measuring the temperature on the circuit. Appropriate protective measures can then be taken by the control software of the power electronics unit, such as lowering the drive current or switching off the motor. In the following, the present invention will be explained in greater detail on the basis of the embodiments shown in the drawings, in which:

FIG. 1 is a three-dimensional view of a drive apparatus according to the invention, together with an enlarged detail of the electronic circuit board; and FIG. 2 is a cross section through the drive apparatus according to the invention from FIG. 1.

FIG. 1 is a three-dimensional view of the drive apparatus 1 according to the invention having the dimensions and also essentially the appearance of a classic gas spring for supporting a tailgate. The drive apparatus 1 shown has a housing tube 10 on which an overtube 20 is guided in a telescopically slidable manner.

Ball sockets 30, 40 are arranged at each of the two free ends of the tubes 10 and 20 which are inserted into one another, by means of which sockets the drive apparatus can be connected for example to the tailgate and the body of a motor vehicle in the same way as this occurs using gas springs.

FIG. 2 shows the structure of the drive apparatus according to the invention in detail. A bearing 50 is rigidly installed in an end region of the housing tube 10 which faces the overtube 20, on which bearing one end of a threaded spindle 60 which protrudes coaxially into the overtube 20 is rotatably mounted. A spindle nut 70 is arranged on the threaded spindle 60 so as to be rotationally fixed relative to the housing tube 10.

The spindle nut 70 is connected to one end of a spindle tube 80 coaxially surrounding the threaded spindle 60, on the other end of which spindle tube the first ball socket 30 is rigidly arranged.

The spindle nut 70 is axially slidably guided in a guide tube 90 which surrounds the spindle tube 80 and is rigidly connected to the housing tube 10. A helical compression spring 100 is arranged in the annular gap between the guide tube 90 and the overtube 20 which coaxially surrounds said guide tube at a radial distance, one end of which spring is axially supported on the overtube 2 in the region of the first ball socket 30, and the other end of which is axially supported on the housing tube 10. The threaded spindle 60 supports a guide sleeve 110 at the end thereof which faces the first ball socket 30, by means of the cylindrical lateral surface of which guide sleeve the threaded spindle 60 is axially slidably guided in the spindle tube 80. The guide tube 90 has axial slots which extend largely over the length thereof. Radially projecting support pins are arranged on the spindle nut 70 in accordance with the axial slots, which pins extend radially into the axial slots and ensure that the spindle nut 70 cannot rotate relative to the guide tube 90.

The threaded spindle 60 is axially supported in spaced relationship to the bearing 50.

A drive shaft 14 of a gear mechanism 15 is coaxially rotationally fixed to the threaded spindle 60, the gear mechanism 15 being capable of being rotatably driven by an additional drive shaft 17 of an electric motor 16.

The additional drive shaft 17 also protrudes out from the electric motor 16 on the side facing away from the gear mechanism 15 and has a permanent magnet 18 on the free end thereof, which magnet is axially opposed to an electronic circuit board 200 which comprises Hall elements 19 and is arranged in a stationary manner. The second ball socket 40 is connected to the housing tube 10 by means of a cap 24.

As shown in the detailed view in FIG. 1, the substantially disc-shaped electronic circuit board 200, which, as shown in FIG. 2, is arranged in the drive apparatus 1 so as to be perpendicular to the axis of rotation of the tubes 10 and 20, not only has the Hall elements 19, but also has the circuit breakers 210 and the electronic circuits 220 which are required in order to actuate these circuit breakers 210, in which circuits the computer programs for controlling the circuit breakers are also stored. Further arranged on the same electronic circuit board 200 is the power electronics unit 225 for actuating the electric motor 16. The power electronics unit 225 includes control software for controlling the electric motor 16 by pulse modulation.

In this manner, the present invention achieves optimal protection against the interference frequencies from the pulse width modulation and a minimal drop in voltage between the power electronics unit and the electric motor, using the same overall length as the original drive apparatuses.

Preferably, the electronic circuit board 200 can also comprise a temperature sensor 230, which is optimally arranged using the arrangement of the electronic circuit board according to the invention, in order to monitor the operating temperature of the electric motor 16.

The invention claimed is:

1. Tubular drive apparatus for a panel, a rear cover, a tailgate or a door of a vehicle, comprising two tubes which are inserted into one another in a telescopic manner, the free ends of which are each hinged to the panel, the rear cover, the tailgate or the door of the vehicle and to the vehicle itself, the tubes being capable of being separated from one another and brought together by a spindle which is driven by an electric motor and comprises a spindle nut arranged thereon, in order to thus open and close the panel, the rear cover, the tailgate or the door, wherein the electric motor, the spindle, the spindle nut and an electronic circuit board having sensor elements mounted thereon are arranged within the tubular drive apparatus, wherein a power electronics unit for actuating the electric motor and including control software for controlling the electric motor by pulse width modulation is additionally arranged on the same electronic circuit board, and the electronic circuit board also comprises a temperature sensor for monitoring the operating temperature of the electric motor and Hall elements, and wherein the electronic circuit board is arranged directly on the electric motor between the electric motor and the free end of the tube supporting the electric motor, and a permanent magnet is axially opposed to the electronic circuit board between the electronic circuit board and the electric motor.

2. Drive apparatus according to claim 1, wherein the electronic circuit board is in the shape of a disc and is arranged perpendicularly to the axis of symmetry of the tubes.

3. Drive apparatus according to claim 1, wherein the housing tube includes a material exhibiting high electrical conductivity.

4. Drive apparatus according to claim 3, wherein the housing tube is made of a magnetically soft material.

5. Drive apparatus according to claim 1, wherein the temperature sensor measures temperature on the electronic circuit board for detecting overheating of the electric motor.

6. Drive apparatus according to claim 1, wherein a cap is positioned in the free end of the tube supporting the electric motor, the cap including a recessed portion sized to receive the electronic circuit board.

* * * * *